(12) United States Patent
Asakura

(10) Patent No.: US 6,847,476 B2
(45) Date of Patent: Jan. 25, 2005

(54) IMAGE DISPLAY APPARATUS

(75) Inventor: Tsutou Asakura, Odawara (JP)

(73) Assignee: Victor Company of Japan, Limited, Yokohama (JP)

( * ) Notice: Subject to any disclaimer, the term of this patent is extended or adjusted under 35 U.S.C. 154(b) by 0 days.

(21) Appl. No.: 10/788,267

(22) Filed: Mar. 1, 2004

(65) Prior Publication Data

US 2004/0174582 A1 Sep. 9, 2004

(30) Foreign Application Priority Data

Mar. 6, 2003 (JP) ..................................... P2003-059278

(51) Int. Cl.$^7$ ............................ G20F 1/03; G03B 21/00
(52) U.S. Cl. ........................ 359/246; 359/245; 353/31; 353/33
(58) Field of Search ............................... 359/246, 245, 359/247, 250; 353/31, 33, 34, 37

(56) References Cited

U.S. PATENT DOCUMENTS 5,268,775 A    12/1993   Zeidler .......................... 349/5
6,010,221 A *  1/2000   Maki et al. ................... 353/33
6,454,416 B2 * 9/2002   Aoto et al. ................... 353/31
2002/0089679 A1 7/2002   Yi et al. ...................... 358/1.9

FOREIGN PATENT DOCUMENTS

JP    2002-122810    4/2002
JP    2002-287094    10/2002

* cited by examiner

Primary Examiner—Timothy Thompson
(74) Attorney, Agent, or Firm—Nath & Associates PLLC; Gary M. Nath; Gregory B. Kang

(57) ABSTRACT

Removal of unnecessary reflected light in an image display apparatus employing reflective spatial light modulators to enable display of a high-quality image, having good contrast and no occurrence of the ghosting phenomena. Modulated light of each color synthesized by a fourth modulated light beam splitter 16 is injected into a projection lens 19 as circularly polarized light by a λ/4 plate 18, reflected light (R', G', B') reflected from the projection lens 19 does not return to the respective spatial light modulating elements 7, 11 and 12 for each color.

3 Claims, 7 Drawing Sheets

IMAGE DISPLAY APPARATUS

FIELD OF THE INVENTION

The present invention relates to an image display apparatus employing reflective spatial light modulators.

BACKGROUND OF THE INVENTION

Image display apparatuses employing reflective spatial light modulators have been proposed. FIG. 1 provides a plan view of the configuration of a conventional image display apparatus. In the image display apparatus shown in FIG. 1 light beams emitted from a white light source 101 are formed into parallel light beams by a concave reflector 102 before entering a polarized light selector 103.

This polarized light selector 103 consisting of a polarizing plate or ps-converter forms light beams emitted from the white light source 101 into linearly polarized light and passes that light. Red, green and blue light of a light beam emitted from the white light source 101 each become linearly polarized light of the same plane of polarization with respect to each other.

Light beams emitted from the white light source 101 enter a primary multilayered phase differentiation filter 104. This multilayered phase differentiation filter 104, providing optical elements comprising a multilayered arrangement of phase plates, rotates the inclination of the plane of polarization of specific wavelength regions only by 90°. The plane of polarization of green and blue light in light beams passing this primary multilayered phase differentiation filter 104 is perpendicular in relation to the plane of polarization of red light.

A light beam passed from this primary multilayered phase differentiation filter 104 then enters a primary polarized light beam splitter 105. In relation to a reflective surface 105a in this primary polarized light beam splitter 105, red light becomes s-polarized light and green and blue light become p-polarized light. Thus, in this primary polarized light beam splitter 105 red light is reflected at the reflective surface 105a while the green and blue light pass the reflective surface 105a.

Green and blue light emitted from the primary polarized light beam splitter 105 enters a secondary multilayered phase differentiation filter 109. In this secondary multilayered phase differentiation filter 109 the plane of polarization of green light is made into a condition perpendicular to the plane of polarization of blue light, and this green and blue light pass the secondary multilayered phase differentiation filter 109.

Green and blue light directed from the secondary multilayered phase differentiation filter 109 enters a secondary polarized light beam splitter 106. In relation to a reflective surface 106a in this secondary polarized light beam splitter 106, green light becomes s-polarized light and blue light becomes p-polarized light.

The green light is reflected at this reflective surface 106a, and is directed out from the secondary polarized light beam splitter 106 entering a reflective spatial light modulator for green light 112. Light entering this reflective spatial light modulator for green light 112, a liquid crystal display device, undergoes polarization-modulation coordinated to the green light component of a displayed image and is reflected.

Primary modulated light modulated and reflected by the reflective spatial light modulator for green light 112 reenters the secondary polarized light beam splitter 106. As this primary modulated light becomes p-polarized light in relation to the reflective surface 106a the primary modulated light passes the reflective surface 106a and is emitted from the secondary polarized light beam splitter 106 in a direction different to the direction of returning to the primary polarized light beam splitter 105.

Blue light passes the reflective surface 106a and is emitted from the secondary polarized light beam splitter 106 entering a reflective spatial light modulator for blue light 107. Light entering this reflective spatial light modulator for blue light 107, a liquid crystal display device, undergoes polarization-modulation coordinated to the blue light component of a displayed image and is reflected.

Secondary modulated light modulated and reflected by the reflective spatial light modulator for blue light 107 reenters the secondary polarized light beam splitter 106. As this secondary modulated light becomes s-polarized light in relation to the reflective surface 106a this light is reflected at the reflective surface 106a and emitted from the secondary polarized light beam splitter 106 in a direction different to the direction of returning to the primary polarized light beam splitter 105.

The primary and secondary modulated lights thus emitted from the secondary polarized light beam splitter 106 enter a tertiary multilayered phase differentiation filter 109. This tertiary multilayered phase differentiation filter 109 rotates the plane of polarization of the primary modulated light only by 90° and injects the primary and secondary modulated lights into a fourth polarized light beam splitter 116.

Red light emitted from the primary polarized light beam splitter 105 enters the tertiary polarized light beam splitter 110. In this tertiary polarized light beam splitter 110, red light becomes s-polarized light in relation to a reflective surface 110a. The red light is reflected at the reflective surface 110a and emitted from the tertiary polarized light beam splitter 110 entering a reflective spatial light modulator for red light 111.

Light entering this reflective spatial light modulator for red light 111, a liquid crystal display device, undergoes polarization-modulation coordinated to the red light component of a displayed image and is reflected.

Tertiary modulated light modulated and reflected at the reflective spatial light modulator for red light 111 reenters the tertiary polarized light beam splitter 110. As this tertiary modulated light becomes p-polarized light in relation to the reflective surface 110a this light passes the reflective surface 110a and is emitted from the tertiary polarized light beam splitter 110 and injected into the fourth polarized light beam splitter 116.

In this fourth polarized light beam splitter 116, the primary modulated and secondary modulated lights becomes s-polarized light in relation to the reflective surface 116a and are reflected at the reflective surface 116a and emitted from the fourth polarized light beam splitter 116. The tertiary modulated light passes through the reflective surface 116a and is directed out from the fourth polarized light beam splitter 116. The primary, secondary and tertiary modulated lights are synthesized in this way.

Light directed out from the fourth polarized light beam splitter 116 enters an optical projection system 118. This optical projection system 118 projects the light thus input on to a screen not shown in the drawing, providing an image display thereof.

Japanese Patent Application Laid-Open Publication No. 2002-122810 and No. 2002-287094 are hereby cited as prior patent documents in connection with the present technical field.

Of light emitted from the fourth polarized light beam splitter 116 in a conventional image display apparatus as described above, the primary and secondary modulated lights enter the optical projection system 118 in a condition of s-polarized light in relation to the reflective surface 116a while the tertiary modulated light enters the optical projection system 118 in a condition of p-polarized light in relation to the reflective surface 116a.

The optical projection system 118 is constructed of a plurality of lenses. An anti-reflection film is formed on this plurality of lenses to improve the rate of light permeation. Ideally, such an anti-reflection film would result in no reflection occurring, however a small degree of reflection in the order of a few percent does occur.

Accordingly, a part of a light beam entering the optical projection system 118 is reflected, the direction of light polarization thereof remaining unchanged, by the plurality of lenses of the optical projection system 118 and reenters the fourth polarized light beam splitter 116 in that condition.

In this way light reentering the fourth polarized light beam splitter 116 from the optical projection system 118 returns respectively in accordance with the color (i.e. blue, green or red) to the reflective spatial light modulators 107, 111 or 112. This returning light (R', G', B') is again reflected and directed into the optical projection system 118.

Light thus reentering the optical projection system 118 is superimposed on the light corresponding to that of the original image information and projected on screen. The image thus displayed contains superimposition of unnecessary image elements resulting in substantial deterioration in image quality. That is to say, such an image has poor contrast and the ghosting phenomena occur.

With the foregoing in view the present invention provides an image display apparatus employing reflective spatial light modulators that displays a high-quality image, having unnecessary image elements removed and having good contrast and no occurrence of the ghosting phenomena.

SUMMARY OF THE INVENTION

The image display apparatus according to the present invention includes: a white light emitting source; a primary wavelength selective polarized light converter for converting light emitted from this white light emitting source to a condition such that the red light, green light and blue light components thereof are respectively linearly polarized, the plane of polarization of primary color component light being perpendicular in relation to the plane of polarization of secondary color component light and tertiary color component light; a primary polarized light separator into which light passing through the primary wavelength selective polarized light converter enters, that separates the optical path of the primary color component light and the optical path of the secondary color component light and tertiary color component light in response to the directions of the planes of polarization thereof; a secondary polarized light separator into which this primary color component light enters from the primary polarized light separator, that inject this primary color component light into a primary reflective spatial light modulator and into which primary modulated light, polarization-modulated in coordination to a primary color component of a displayed image as well as reflected by, the primary reflective spatial light modulator reenters and that emits this primary modulated light in a direction different to the direction of returning to the primary polarized light separator; a secondary wavelength selective polarized light converter into which the secondary color component light and the tertiary color component light enter from the primary polarized light separator and wherein the plane of polarization of the tertiary color component light is formed into a condition perpendicular to the plane of polarization of the secondary color component light; a tertiary polarized light separator into which the secondary color component light and the tertiary color component light enter from the secondary wavelength selective polarized light converter, that injects the secondary color component light into a secondary reflective spatial light modulator and injects the tertiary color component light into a tertiary reflective spatial light modulator, into which secondary modulated light, polarization-modulated in coordination to a secondary color component of a displayed image as well as reflected by, this secondary reflective spatial light modulator reenters and into which tertiary modulated light, polarization-modulated in coordination to a tertiary color component of a displayed image as well as reflected by, this tertiary reflective spatial light modulator reenters and that emits this secondary modulated light and this tertiary modulated light in a direction different to the direction of returning to the secondary wavelength selective polarized light converter; a polarized light synthesizer into which enters the primary modulated light emitted from the secondary polarized light separator and the secondary and tertiary modulated light emitted from the tertiary polarized light separator, and that synthesizes and then emits these primary, secondary and tertiary modulated lights; and a phase converter into which enters light emitted from the polarized light synthesizer, that makes at least the second modulated light and the third modulated light into circularly polarized light and emits that circularly polarized light to an optical projection system.

In this image display apparatus, as at least secondary modulated light and tertiary modulated light of the primary, secondary and tertiary modulated lights synthesized by the polarized light synthesizer are converted into circularly polarized light and also emitted to an optical projection system by the phase converter, light reflected at the optical projection system reenters the phase converter and is in a condition in which the plane of polarization thereof is perpendicular in relation to the light that originally entered the phase converter.

Further, it is desirable, in the image display apparatus according to this invention, that a tertiary wavelength selective polarized light converter that makes the planes of polarization of the primary, secondary and tertiary modulated lights emitted from the polarized light synthesizer the same, be disposed between the polarized light synthesizer and the phase converter.

Thus, reflected light reflected at the optical projection system and reentering the polarized light synthesizer can be definitively prevented from returning to the reflective spatial light modulators for the respective colors, red, green and blue.

Again, it is desirable, in a projection type image display apparatus according to this invention, that a polarized light selector that selects and allows to pass only light having a plane of polarization of a prescribed direction, be disposed between the tertiary wavelength selective polarized light converter and the phase converter.

Here, the polarized light selector passes primary, secondary and tertiary modulated light having respective planes of polarization of the same direction emitted from the tertiary wavelength selective polarized light converter, but light returning after being reflected at the optical projection system, having a plane of polarization perpendicular to that plane of polarization of the same direction, can be blocked from reentering via the phase converter.

Further, it is desirable, in the image display apparatus according to this invention, that primary color component light is blue, secondary color component light is red and tertiary color component light is green or secondary color component light is green and tertiary color component light is red.

In this case, even though blue light reflected at the optical projection system returns as far as the reflective spatial light modulators and again enters the optical projection system, no problem arises in reality because the human eye has very low sensitivity to blue light.

Again, it is desirable, in the image display apparatus according to this invention, that a blue light selector that allows only blue light to pass be disposed between the secondary polarized light separator and the polarized light synthesizer. When primary color component light is blue light, disposing a blue light selector in this way enables contrast to be improved.

It is desirable that the phase converter changes the plane of polarization of the secondary and tertiary color component lights entering therein from the polarized light synthesizer, to a condition perpendicular to the plane of polarization of the secondary and tertiary color component lights that enter the optical projection system from the polarized light synthesizer and that are reflected at the optical projection system and reenter the polarized light synthesizer.

BRIEF DESCRIPTION OF THE DRAWINGS

Figure 1:
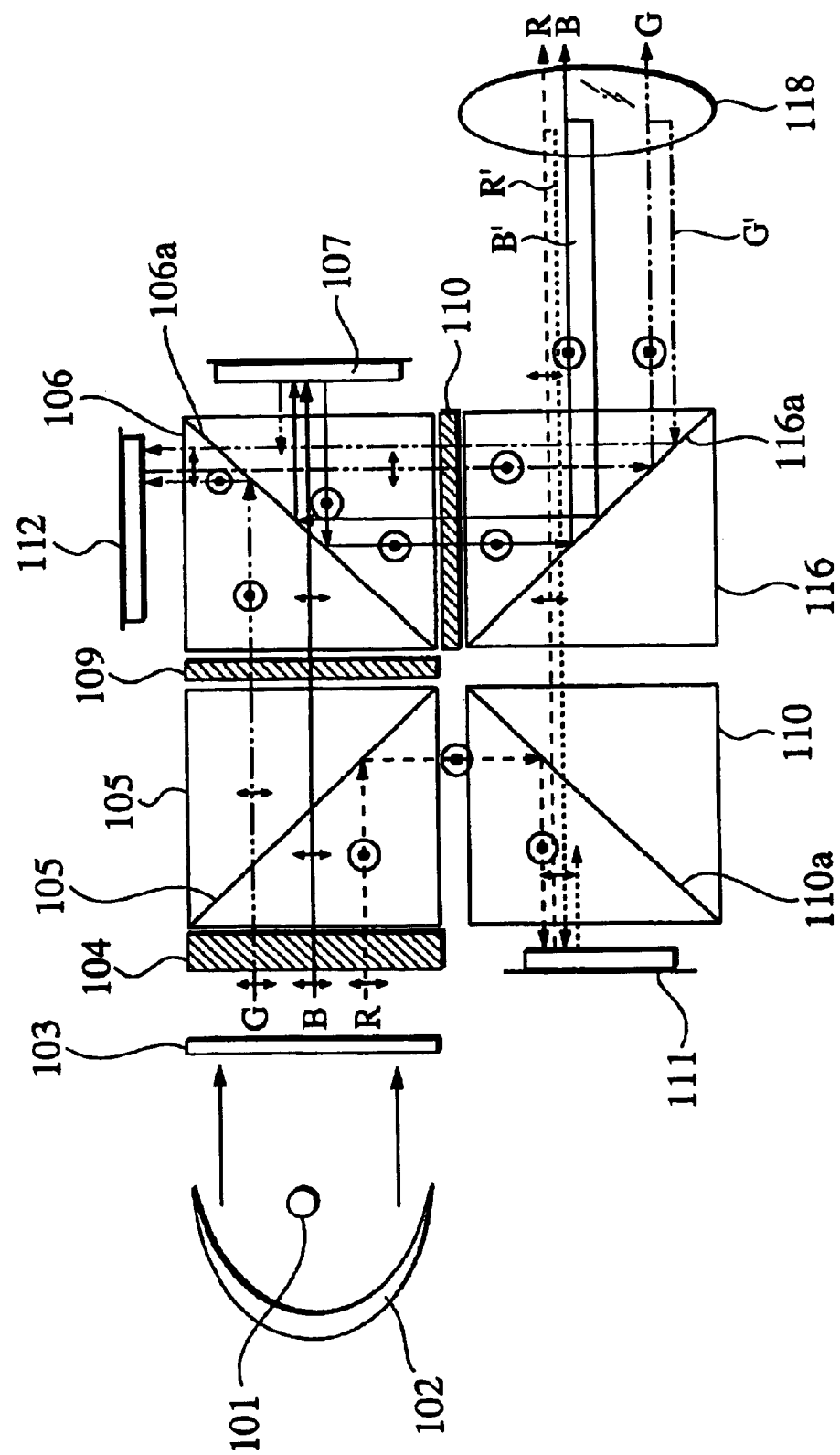

Having thus described the invention in general terms, reference will now be made to the accompanying drawings, which are not necessarily drawn to scale, and wherein:

FIG. 1 is a plan view of the configuration of a conventional image display apparatus.

Figure 2:
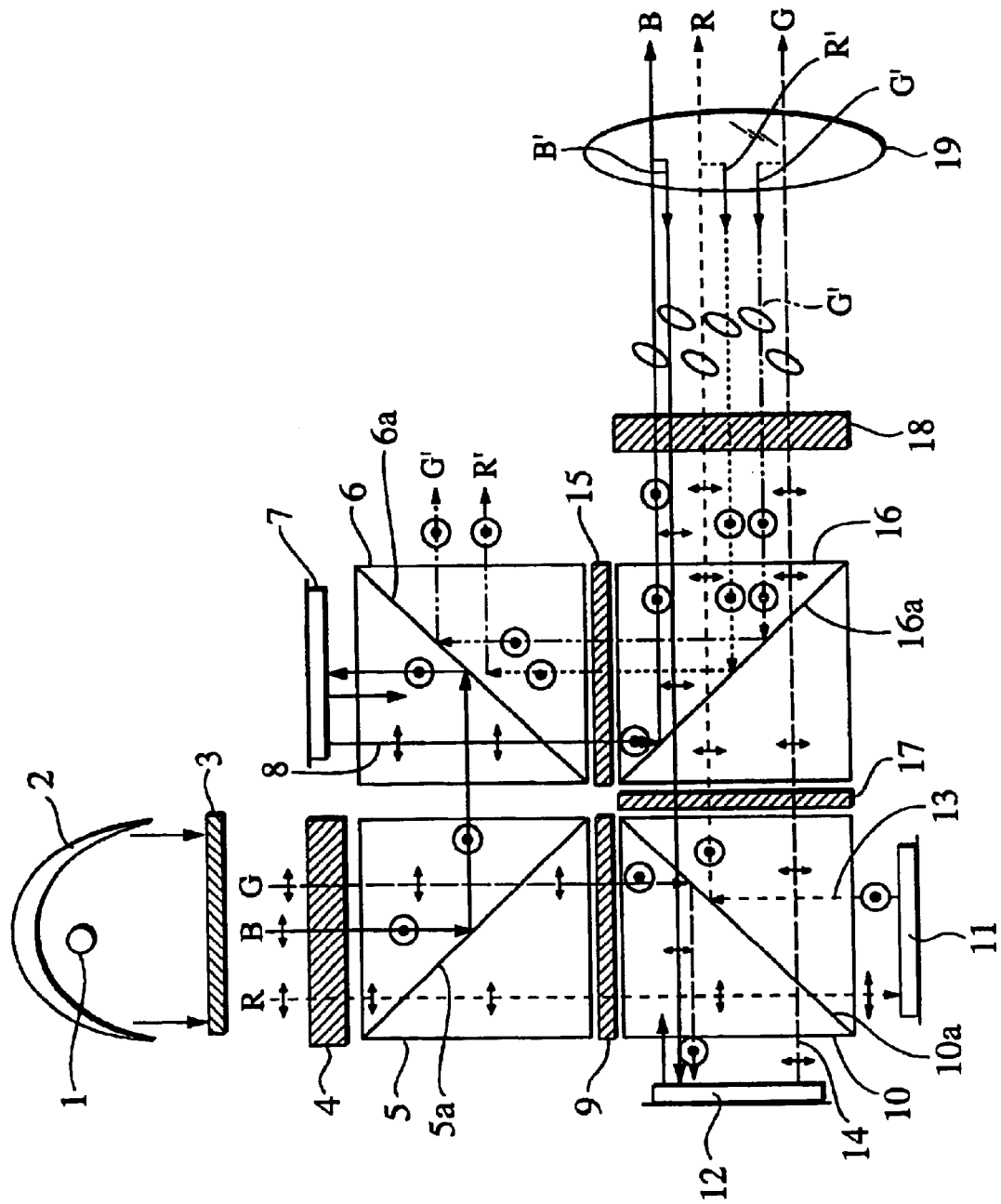

FIG. 2 is a plan view of an embodiment of an image display apparatus according to this invention.

Figure 3:
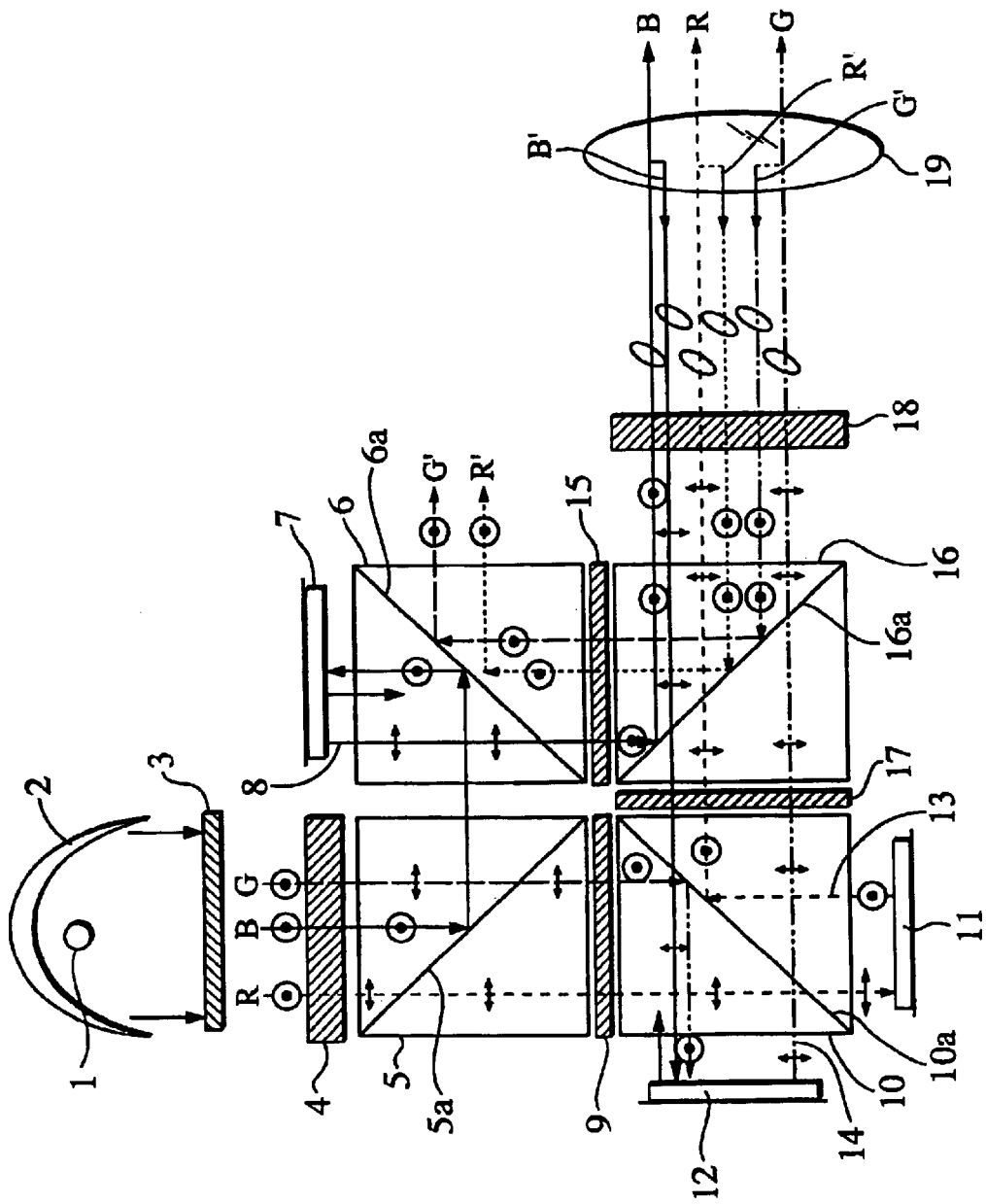

FIG. 3 is a plan view of another embodiment of an image display apparatus according to this invention.

Figure 4:
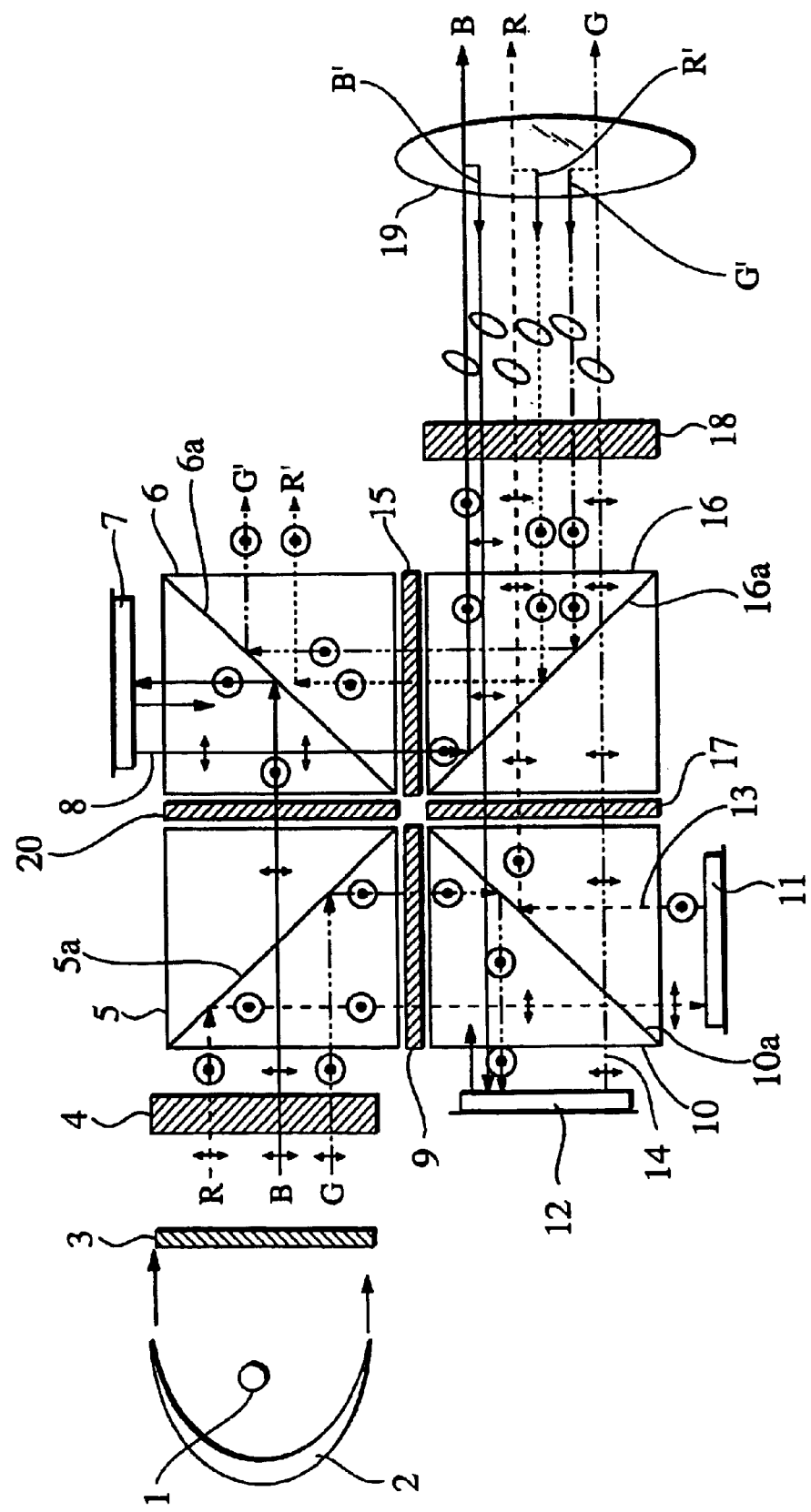

FIG. 4 is a plan view of still another embodiment of an image display apparatus according to this invention.

Figure 5:
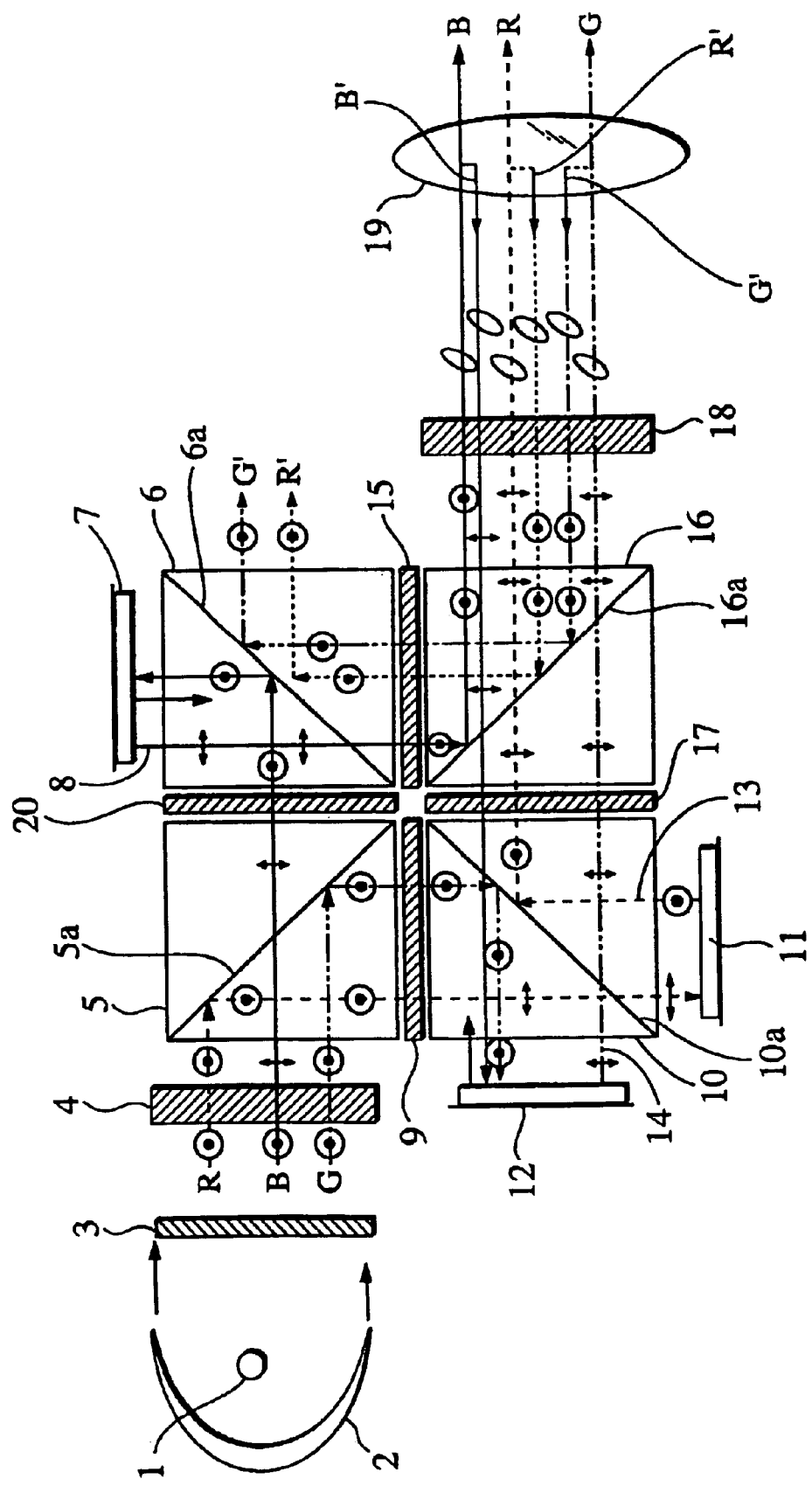

FIG. 5 is a plan view of still another embodiment of an image display apparatus according to this invention.

Figure 6:
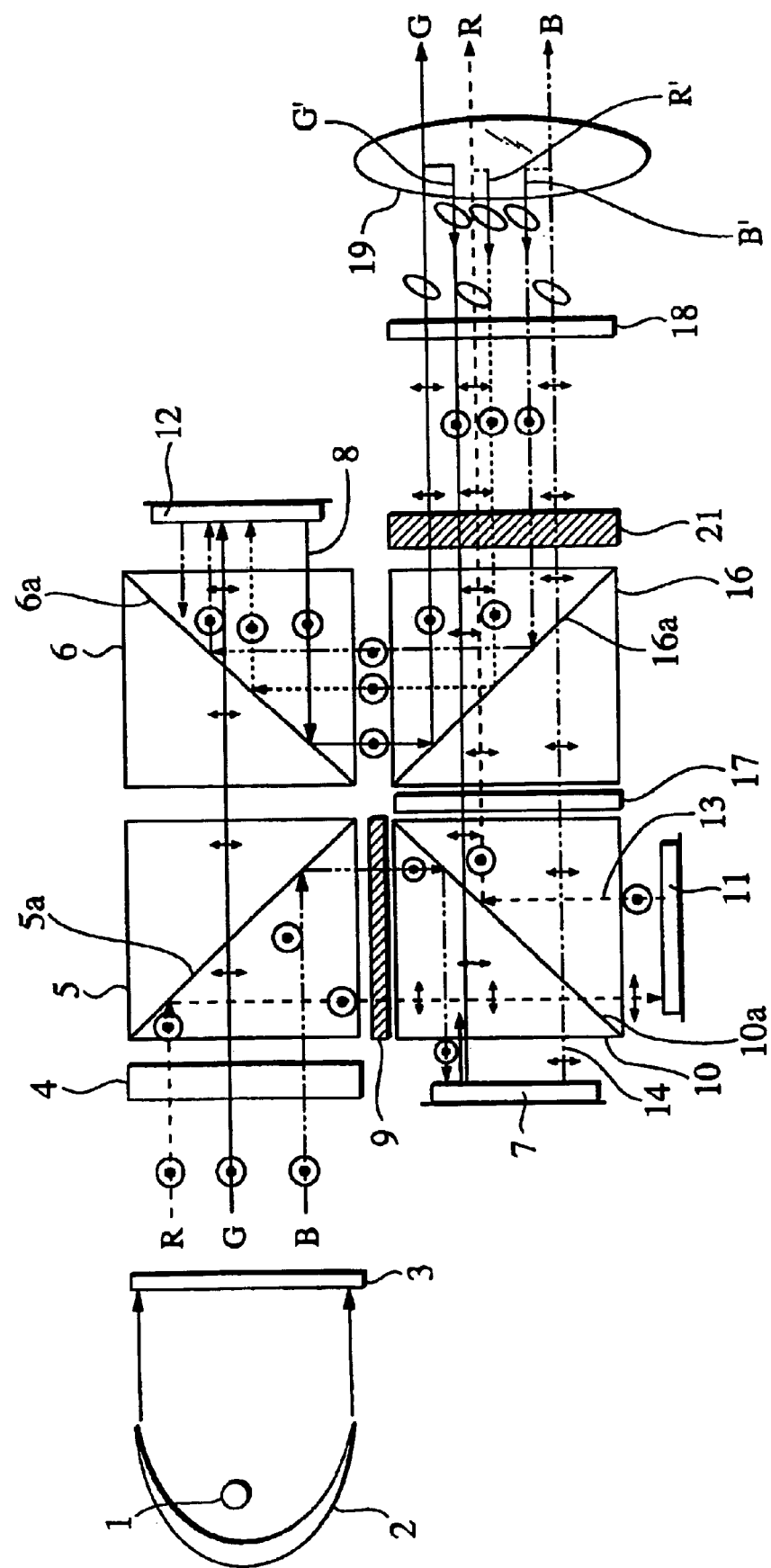

FIG. 6 is a plan view of still another embodiment of an image display apparatus according to this invention.

Figure 7:
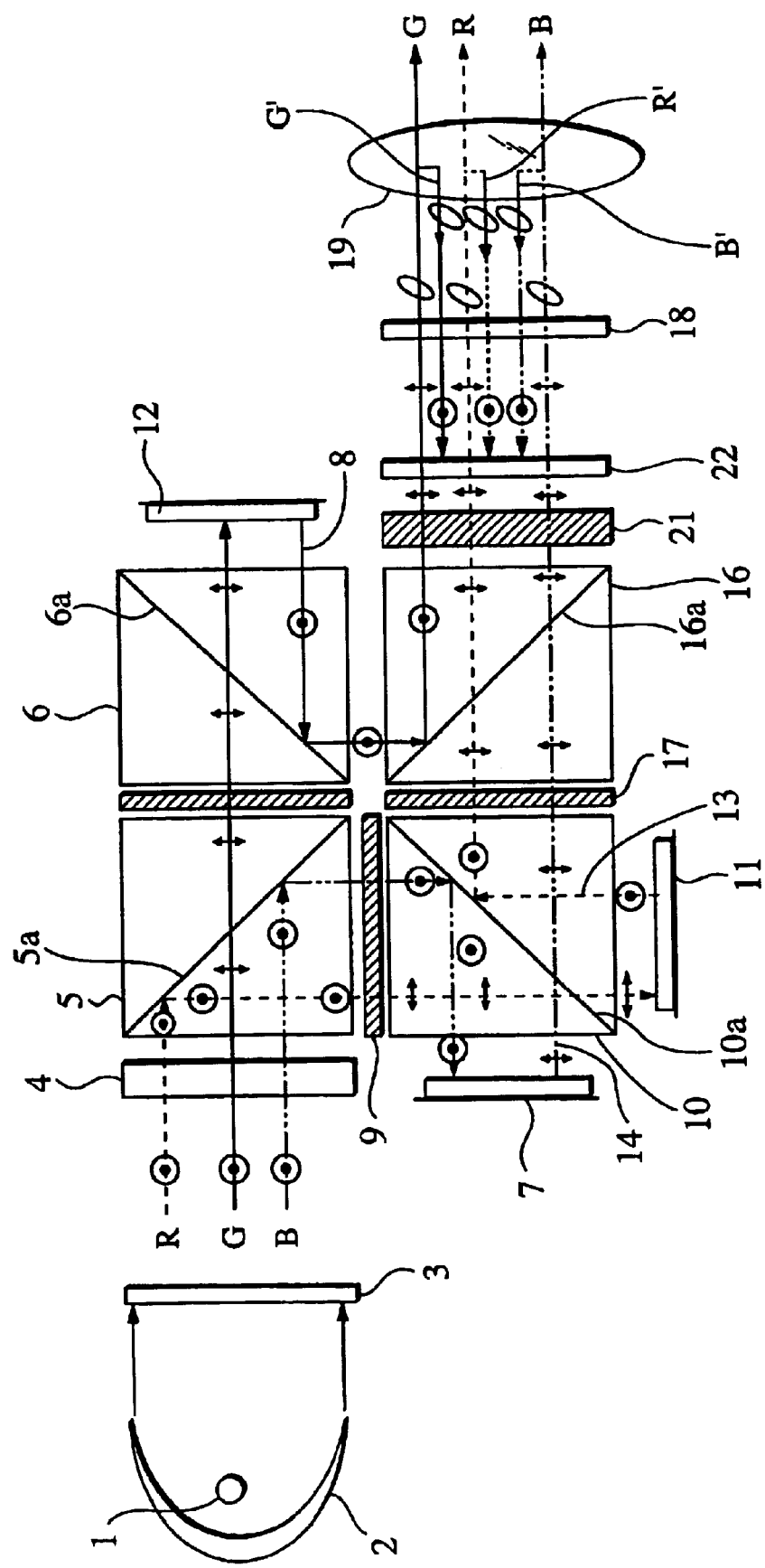

FIG. 7 is a plan view of still another embodiment of an image display apparatus according to this invention.

DETAILED DESCRIPTION OF THE INVENTION

The present invention now will be described more fully hereinafter with reference to the drawings, in which preferred embodiments of the invention are shown. This invention may, however, be embodied in many different forms and should not be construed as limited to the embodiments set forth herein; rather, these embodiments are provided so that this disclosure will be through and complete, and will fully convey the scope of the invention to those skilled in the art. Like numbers refer to like elements throughout.

FIG. 2 is a plan view of an embodiment of an image display apparatus according to this invention. In this image display apparatus shown in FIG. 2 light beams emitted from a white light source 1 are formed into parallel light beams by a concave reflector 2 before entering a polarized light selector 3. An electric discharge lamp such as an ultra high performance mercury lamp (UHP lamp) can be used for this white light source 1. Further, a parabolic mirror can be used for the concave reflector 2.

The polarized light selector 3, a polarizing plate or ps-converter, forms a light beam emitted from the white light source 1 into linearly polarized light and passes that light. Red, green and blue light of a light beam emitted from the white light source 1 and passing the polarized light selector 3 each become linearly polarized light, the respective planes of polarization thereof being in the same direction with respect to each other.

A light beam emitted from the white light source 1 then enters a primary multilayered phase differentiation filter 4 that forms a primary wavelength selective polarized light converter. This multilayered phase differentiation filter 4, providing optical elements comprising a multilayered arrangement of phase plates, rotates the inclination of the plane of polarization of specific wavelength regions only by 90°. A ColorSelect® filter made by ColorLink, Inc. for example can be used for this multilayered phase differentiation filter 4.

Red light, green light and blue light in a light beam passing this primary multilayered phase differentiation filter 4 are each linearly polarized and the plane of polarization of primary color component light only is rotated 90°, while the plane of polarization of primary color component light is perpendicular to the plane of polarization of secondary color component light and tertiary color component light. In this embodiment, primary color component light is blue (B), secondary color component light is red (R) and tertiary color component light is green (G). That is to say, the plane of polarization of blue is perpendicular in relation to the plane of polarization of red and green.

A light beam passing this primary multilayered phase differentiation filter 4 then enters a primary polarized light beam splitter 5 comprising a primary polarized light separator. In relation to a reflective surface 5a that is in this primary polarized light beam splitter 5 positioned at an inclination of 45° to the optical path of this incoming light, blue light becomes s-polarized light and red and green light become p-polarized light. Thus, in this primary polarized light beam splitter 5 blue light is reflected at the reflective surface 5a while the reflective surface 5a passes red and green light such that the optical path of the blue light diverges from the optical path of the red light and green light in response to the direction of the planes of polarization thereof.

Blue light emitted from the primary polarized light beam splitter 5 enters a secondary polarized light beam splitter 6 comprising a secondary polarized light separator. In relation to a reflective surface 6a positioned at an inclination of 45° to the optical path of this incoming light this blue light is s-polarized light. This blue light is reflected at the reflective surface 6a and directed out from this secondary polarized light beam splitter 6 entering a reflective spatial light modulator for blue light 7 that is a primary reflective spatial light modulator. This light entering this reflective spatial light modulator for blue light 7, a liquid crystal display device, undergoes polarization-modulation coordinated to the blue light component of a displayed image and is reflected. The information for this displayed image is supplied to the reflective spatial light modulator for blue light 7 from an external source.

The resulting primary modulated light 8 modulated and reflected by the reflective spatial light modulators for blue light 7 reenters the secondary polarized light beam splitter 6. As this primary modulated light 8 becomes p-polarized light in relation to the reflective surface 6a this light passes the reflective surface 6a and is emitted from the secondary polarized light beam splitter 6 in a direction different to the direction of returning to the primary polarized light beam splitter 5.

Red and green light emitted from the primary polarized light beam splitter 5 enters a secondary multilayered phase differentiation filter 9 providing a secondary wavelength selective polarized light converter wherein the plane of polarization of red light is made into a condition perpendicular to the plane of polarization of green light, and this red and green light pass the secondary multilayered phase differentiation filter 9.

Light beams passing this secondary multilayered phase differentiation filter 9 enter a tertiary polarized light beam splitter 10 providing a tertiary polarized light separator. In relation to a reflective surface 10a positioned at an inclination of 45° to the optical path of this incoming light, this red light is p-polarized light and green light is s-polarized light.

Red light passes the reflective surface 10a and is emitted from the tertiary polarized light beam splitter 10 before entering a reflective spatial light modulator for red light 11 providing a secondary reflective spatial light modulator. Green light is reflected at the reflective surface 10a and directed out from this tertiary polarized light beam splitter 10 before entering a reflective spatial light modulator for green light 12 that is a tertiary reflective spatial light modulator.

The reflective spatial light modulators for red light 11 and green light 12 are liquid crystal display devices; red light undergoing polarization-modulation coordinated to the red light component of a displayed image and being reflected in the reflective spatial light modulator for red light 11 and green light undergoing polarization-modulation coordinated to the green light component of a displayed image and being reflected in the reflective spatial light modulator for green light 12; the information for the respective displayed images therefor being supplied from an external source.

Secondary modulated light 13 modulated and reflected by the reflective spatial light modulator for red light 11 reenters the tertiary polarized light beam splitter 10. As this secondary modulated light 13 becomes s-polarized light in relation to the reflective surface 10a this light is reflected at the reflective surface 10a and is emitted from the tertiary polarized light beam splitter 10 in a direction different to the direction of returning to the primary polarized light beam splitter 5.

Tertiary modulated light 14 modulated and reflected by the reflective spatial light modulator for green light 12 reenters the tertiary polarized light beam splitter 10. As this tertiary modulated light 14 becomes p-polarized light in relation to the reflective surface 10a the tertiary modulated light 14 passes the reflective surface 10a and is emitted from the tertiary polarized light beam splitter 10 in a direction different to the direction of returning to the primary polarized light beam splitter 5.

Primary modulated light 8 emitted from the secondary polarized light beam splitter 6 enters a tertiary multilayered phase differentiation filter 15 that rotates the plane of polarization of the primary modulated light 8 90° and passes that light, injecting that light into a fourth polarized light beam splitter 16 providing a polarized light synthesizer.

The tertiary multilayered phase differentiation filter 15 has wavelength filtering characteristics that selectively pass only blue light, thereby contributing to improved contrast by interrupting light in an unnecessary wavelength region. The tertiary multilayered phase differentiation filter 15 of the embodiments described hereinbelow also provide these same characteristics.

The secondary modulated light 13 and tertiary modulated light 14 emitted from the tertiary polarized light beam splitter 10 enter a fourth multilayered phase differentiation filter 17 that rotates the plane of polarization of the secondary modulated light 13 90° and passes the secondary modulated light 13 and tertiary modulated light 14 injecting those lights into a fourth polarized light beam splitter 16. At this time the respective planes of polarization of the secondary modulated light 13 and the tertiary modulated light 14 are of the same direction.

In relation to a reflective surface 16a positioned in this polarized light beam splitter 16 at an inclination of 45° to the optical path of this incoming light, this primary modulated light 8 is s-polarized light and the secondary modulated light 13 and tertiary modulated light 14 are p-polarized light. The primary modulated light 8 is reflected at the reflective surface 16a and emitted from the polarized light beam splitter 16. The secondary modulated light 13 and tertiary modulated light 14 pass the reflective surface 16a and are emitted from the polarized light beam splitter 16. The primary modulated light 8 as well as the secondary modulated light 13 and tertiary modulated light 14 are synthesized in this way.

The light emitted from this polarized light beam splitter 16 enters a ¼-wavelength plate (λ/4-plate) 18 providing a phase converter. This ¼-wavelength plate 18 circularly polarizes the primary modulated light 8, secondary modulated light 13 and tertiary modulated light 14 and injects those lights into an optical projection system 19. It is also suitable for the ¼-wavelength plate 18 to circularly polarize only the secondary modulated light 13 and the tertiary modulated light 14.

The optical projection system 19 projects this incoming light onto a screen not shown in the drawing, thereby displaying an image. This optical projection system 19 is formed of a plurality of lenses having an anti-reflection film formed thereon to improve the rate of light permeation.

In this image display apparatus, when reflection in the order of a few percent arises from this plurality of lenses providing the optical projection system 19, this reflected light (R', G', B') is light with a circular polarization of the opposite direction to light entering the optical projection system 19 and reenters the ¼-wavelength plate 18. The reflected light thus reentering this ¼-wavelength plate is converted from circularly polarized light to linearly polarized light. The direction of the plane of polarization at this time is a direction perpendicular to the direction of the plane of polarization of each of the modulated lights first entering this ¼-wavelength plate. Accordingly, reflected light entering the polarized light beam splitter 16 from the optical projection system 19 in this way does not return to the respective reflective spatial light modulators 7, 11 and 12. Thus, in this image display apparatus reflected light from the optical projection system 19 is not projected on screen superimposed over light coordinated to original image information, enabling display of an image having high contrast and in which the ghosting phenomena does not occur.

In this image display apparatus, blue light reflected at the optical projection system 19 passes the polarized light beam splitter 16 and the tertiary polarized light beam splitter 10 and returns as far as the reflective spatial light modulator for green light 12 where there is the possibility that the blue light may be reflected and enter the optical projection system 19 again. Because the human eye has very low sensitivity to blue light however, in fact this causes no problem.

Further, in this image display apparatus, where primary color component light is red, secondary color component light is green and tertiary color component light is blue or secondary color component light is blue and tertiary color component light is green, because unnecessary reflection in the optical projection system 19 of green light, to which the human eye has the greatest sensitivity, is removed, a sufficient effect is achieved in relation to human vision.

Moreover, in this image display apparatus if emphasis is placed on red light and blue light in the elimination of unnecessary reflected light at the optical projection system 19, it is sufficient for primary color component light to be green, secondary color component light to be red and tertiary color component light to be blue or secondary color component light to be blue and tertiary color component light to be red.

FIG. 3 is a plan view of another embodiment of an image display apparatus according to this invention.

This image display apparatus can be constructed as shown in FIG. 3. That is to say in this image display apparatus light beams emitted from a white light source 1 are formed into parallel light beams by a concave reflector 2 before entering a polarized light selector 3.

This polarized light selector 3 forms a light beam emitted from the white light source 1 into linearly polarized light and passes this light. The red, green and blue light components of light beams emitted from the white light source 1 and passing the polarized light selector 3 each become linearly polarized light having a plane of polarization of the same direction.

A light beam emitted from the white light source 1 then enters a primary multilayered phase differentiation filter 4 that forms a primary wavelength selective polarized light converter. This multilayered phase differentiation filter 4 rotates the inclination of the plane of polarization of specific wavelength regions only 90°.

Red light, green light and blue light in a light beam passing this primary multilayered phase differentiation filter 4 are each linearly polarized and the plane of polarization of secondary and tertiary color component lights only are rotated 90°, while the plane of polarization of the primary color component light is perpendicular to the plane of polarization of secondary color component light and tertiary color component light. In this embodiment, primary color component light is blue (B), secondary color component light is red (R) and tertiary color component light is green (G). That is to say, the plane of polarization of blue light is perpendicular in relation to the plane of polarization of red light and green light.

A light beam passing this primary multilayered phase differentiation filter 4 then enters a primary polarized light beam splitter 5 comprising the primary polarized light separator. In relation to a reflective surface 5a that is positioned in this primary polarized light beam splitter 5 at an inclination of 45° to the optical path of this incoming light, blue light becomes s-polarized light and red and green light become p-polarized light. Thus, in this primary polarized light beam splitter 5 blue light is reflected at the reflective surface 5a while the reflective surface 5a passes red and green light such that the optical path of the blue light diverges from the optical path of the red light and green light in response to the direction of the planes of polarization thereof.

Blue light emitted from the primary polarized light beam splitter 5 enters a secondary polarized light beam splitter 6 comprising the secondary polarized light separator. In relation to a reflective surface 6a positioned at an inclination of 45° to the optical path of this incoming light this blue light is s-polarized light. This blue light is reflected at the reflective surface 6a and directed out from this secondary polarized light beam splitter 6 entering the reflective spatial light modulator for blue light 7, liquid crystal display device providing the primary reflective spatial light modulator, wherein this light undergoes polarization-modulation coordinated to the blue light component of a displayed image and is reflected. The information for that displayed image is supplied from an external source.

The resulting primary modulated light 8 modulated and reflected by the reflective spatial light modulator for blue light 7, reenters the secondary polarized light beam splitter 6. As this primary modulated light 8 becomes p-polarized light in relation to the reflective surface 6a, this light passes the reflective surface 6a and is emitted from the secondary polarized light beam splitter 6 in a direction different to the direction of returning to the primary polarized light beam splitter 5.

Red and green light emitted from the primary polarized light beam splitter 5 enter a secondary multilayered phase differentiation filter 9 providing a secondary wavelength selective polarized light converter wherein the plane of polarization of red light is made into a condition perpendicular to the plane of polarization of green light, and this red and green light pass the secondary multilayered phase differentiation filter 9.

Light beams passing this secondary multilayered phase differentiation filter 9 enter a tertiary polarized light beam splitter 10 providing the tertiary polarized light separator. In relation to a reflective surface 10a positioned at an inclination of 45° to the optical path of this incoming light this red light is p-polarized light and the green light is s-polarized light.

Red light passes the reflective surface 10a and is emitted from the tertiary polarized light beam splitter 10 before entering the reflective spatial light modulator for red light 11 providing the secondary reflective spatial light modulator. Green light is reflected at the reflective surface 10a and directed out from this tertiary polarized light beam splitter 10 before entering the reflective spatial light modulator for green light 12 that is the tertiary reflective spatial light modulator.

The reflective spatial light modulators 11 and 12 are liquid crystal display devices; red light undergoing polarization-modulation coordinated to the red light component of a displayed image and being reflected in the reflective spatial light modulator for red light 11 and green light undergoing polarization-modulation coordinated to the green light component of a displayed image and being reflected in the reflective spatial light modulator for green light 12; the information for the respective displayed images therefor being supplied from an external source.

Secondary modulated light 13 modulated and reflected by the reflective spatial light modulator for red light 11 reenters the tertiary polarized light beam splitter 10. As this secondary modulated light 13 becomes s-polarized light in relation to the reflective surface 10a this light is reflected at the reflective surface 10a and emitted from the tertiary polarized light beam splitter 10 in a direction different to the direction of returning to the primary polarized light beam splitter 5.

Tertiary modulated light 14 modulated and reflected by the reflective spatial light modulator for green light 12 reenters the tertiary polarized light beam splitter 10. As this tertiary modulated light 14 becomes p-polarized light in relation to the reflective surface 10a this light passes the reflective surface 10a and is emitted from the tertiary polarized light beam splitter 10 in a direction different to the direction of returning to the primary polarized light beam splitter 5.

Primary modulated light 8 emitted from the secondary polarized light beam splitter 6 enters a tertiary multilayered phase differentiation filter 15 that rotates the plane of polarization of this light 90° and passes that light, injecting that light into a fourth polarized light beam splitter 16 providing the polarized light synthesizer.

The secondary modulated light 13 and tertiary modulated light 14 emitted from the tertiary polarized light beam splitter 10 enter a fourth multilayered phase differentiation filter 17 that rotates the plane of polarization of the secondary modulated light 13 90° and passes the secondary modulated light 13 and tertiary modulated light 14, injecting those lights into a fourth polarized light beam splitter 16. At this time the respective planes of polarization of the secondary modulated light 13 and the tertiary modulated light 14 are of the same direction.

In relation to a reflective surface 16a positioned in this polarized light beam splitter 16 at an inclination of 45° to the optical path of this incoming light, this primary modulated light 8 is s-polarized light and the secondary modulated light 13 and tertiary modulated light 14 are p-polarized light. The primary modulated light 8 is reflected at the reflective surface 16a and emitted from the polarized light beam splitter 16. The secondary modulated light 13 and tertiary modulated light 14 pass the reflective surface 16a and are emitted from the polarized light beam splitter 16. The primary modulated light 8 as well as the secondary modulated light 13 and tertiary modulated light 14 are synthesized in this way.

The light emitted from this polarized light beam splitter 16 enters a ¼-wavelength plate (λ/4-plate) 18 providing the phase converter. This ¼-wavelength plate 18 circularly polarizes the primary modulated light 8, secondary modulated light 13 and tertiary modulated light 14 and injects those lights into an optical projection system 19. It is also suitable for the ¼-wavelength plate 18 to circularly polarize only the secondary modulated light 13 and the tertiary modulated light 14.

The optical projection system 19 projects this incoming light onto a screen not shown in the drawing, thereby displaying an image. This optical projection system 19 is formed of a plurality of lenses having an anti-reflection film formed thereon to improve the rate of light permeation.

In this image display apparatus, when reflection in the order of a few percent arises from this plurality of lenses providing the optical projection system 19, the light reflected (R', G', B') is light with a circular polarization of the opposite direction to light entering the optical projection system 19 and reenters the ¼-wavelength plate 18. The reflected light thus reentering this ¼-wavelength plate 18 is converted from circularly polarized light to linearly polarized light. The direction of the plane of polarization at this time is a direction perpendicular to the direction of the plane of polarization of each of the modulated lights first entering this ¼-wavelength plate. Accordingly, reflected light entering the polarized light beam splitter 16 from the optical projection system 19 in this way does not return to the respective reflective spatial light modulators 7, 11 and 12. Thus, in this image display apparatus reflected light from the optical projection system 19 is not projected on screen superimposed over light coordinated to the original image information, enabling display of an image having high contrast and in which the ghosting phenomena does not occur.

In this image display apparatus, blue light reflected at the optical projection system 19 passes the polarized light beam splitter 16 and the tertiary polarized light beam splitter 10 and returns as far as the reflective spatial light modulator for green light 12 where there is the possibility that the blue light may be reflected and enter the optical projection system 19 again. Because the human eye has very low sensitivity to blue light however, in fact this causes no problem.

Further, in this image display apparatus, where primary color component light is red, secondary color component light is green and tertiary color component light is blue or secondary color component light is blue and tertiary color component light is green, because unnecessary reflection in the optical projection system 19 of green light to which the human eye has the greatest sensitivity is removed, a sufficient effect is achieved in relation to human vision.

Moreover, in this image display apparatus if emphasis is placed on red light and blue light in the elimination of unnecessary reflected light at the optical projection system 19, it is sufficient for primary color component light to be green, secondary color component light to be red and tertiary color component light to be blue or secondary color component light to be blue and tertiary color component light to be red.

FIG. 4 is a plan view of still another embodiment of an image display apparatus according to this invention.

This image display apparatus can be constructed as shown in FIG. 4. That is to say in this image display apparatus light beams emitted from a white light source white light source 1 are formed into parallel light beams by a concave reflector 2 before entering a polarized light selector 3.

This polarized light selector 3 forms a light beam emitted from the white light source 1 into linearly polarized light and passes this light. The red, green and blue light components of light beams emitted from the white light source 1 and passing the polarized light selector 3 each become linearly polarized light having a plane of polarization of the same direction.

A light beam emitted from the white light source 1 enters a primary multilayered phase differentiation filter 4 that forms the primary wavelength selective polarized light converter. This multilayered phase differentiation filter 4 rotates the inclination of the plane of polarization of specific wavelength regions only 90°.

Red light, green light and blue light in a light beam passing this primary multilayered phase differentiation filter 4 are each linearly polarized and the plane of polarization of secondary and tertiary color component lights only are rotated 90°, while the plane of polarization of the primary color component light is perpendicular to the plane of polarization of secondary color component light and tertiary color component light. In this embodiment, primary color component light is blue (B), secondary color component light is red (R) and tertiary color component light is green (G). That is to say, the plane of polarization of blue is perpendicular in relation to the plane of polarization of red and green.

A light beam passing this primary multilayered phase differentiation filter 4 then enters a primary polarized light beam splitter 5 comprising the primary polarized light separator. In relation to a reflective surface 5a that is positioned in this primary polarized light beam splitter 5 at an inclination of 45° to the optical path of this incoming light, blue light becomes p-polarized light and red and green light become s-polarized light. Thus, in this primary polarized light beam splitter 5 blue light passes the reflective surface 5a while the reflective surface 5a reflects red and green light such that the optical path of the red light and green light diverges from the optical path of the blue light in response to the direction of the planes of polarization thereof.

Blue light emitted from the primary polarized light beam splitter 5 passes a multilayered phase differentiation filter for blue light 20 wherein the plane of polarization of this blue light is rotated 90° before entering a secondary polarized light beam splitter 6 comprising the secondary polarized light separator. In relation to a reflective surface 6a positioned at an inclination of 45° to the optical path of this incoming light this blue light is s-polarized light. This blue light is reflected at the reflective surface 6a and directed out from this secondary polarized light beam splitter 6 entering the reflective spatial light modulator for blue light 7, a liquid crystal display device providing the primary reflective spatial light modulator, wherein this light undergoes polarization-modulation coordinated to the blue light component of a displayed image and is reflected. The information for that displayed image is supplied from an external source.

The resulting primary modulated light 8 modulated and reflected by the reflective spatial light modulator for blue light 7 reenters the secondary polarized light beam splitter 6. As this primary modulated light 8 becomes p-polarized light in relation to the reflective surface 6a, this light passes the reflective surface 6a and is emitted from the secondary polarized light beam splitter 6 in a direction different to the direction of returning to the primary polarized light beam splitter 5.

Red and green light emitted from the primary polarized light beam splitter 5 enters a secondary multilayered phase differentiation filter 9 providing the secondary wavelength selective polarized light converter, wherein the plane of polarization of red light is made into a condition perpendicular to the plane of polarization of green light, and this red and green light pass the secondary multilayered phase differentiation filter 9.

Light beams passing this secondary multilayered phase differentiation filter 9 enter a tertiary polarized light beam splitter 10 providing the tertiary polarized light separator. In relation to a reflective surface 10a positioned at an inclination of 45° to the optical path of this incoming light this red light is p-polarized light and green light is s-polarized light.

Red light passes the reflective surface 10a and is emitted from the tertiary polarized light beam splitter 10 before entering the reflective spatial light modulator for red light 11 providing the secondary reflective spatial light modulator. Green light is reflected at the reflective surface 10a and directed out from this tertiary polarized light beam splitter 10 before entering the reflective spatial light modulator for green light 12 that is the tertiary reflective spatial light modulator.

The reflective spatial light modulators 11 and 12 are liquid crystal display devices; red light undergoing polarization-modulation coordinated to the red light component of a displayed image and being reflected in the reflective spatial light modulator for red light 11 and green light undergoing polarization-modulation coordinated to the green light component of a displayed image and being reflected in the reflective spatial light modulator for green light 12; the information for the respective displayed images therefor being supplied from an external source.

Secondary modulated light 13 modulated and reflected by the reflective spatial light modulator for red light 11 reenters the tertiary polarized light beam splitter 10. As this secondary modulated light 13 becomes s-polarized light in relation to the reflective surface 10a that light is reflected at the reflective surface 10a and emitted from the tertiary polarized light beam splitter 10 in a direction different to the direction of returning to the primary polarized light beam splitter 5.

Tertiary modulated light 14 modulated and reflected by the reflective spatial light modulator for green light 12 reenters the tertiary polarized light beam splitter 10. As this tertiary modulated light 14 becomes p-polarized light in relation to the reflective surface 10a that light passes the reflective surface 10a and is emitted from the tertiary polarized light beam splitter 10 in a direction different to the direction of returning to the primary polarized light beam splitter 5.

Primary modulated light 8 emitted from the secondary polarized light beam splitter 6 enters a tertiary multilayered phase differentiation filter 15 that rotates the plane of polarization of that light 90° and passes that light, injecting that light into a fourth polarized light beam splitter 16 providing the polarized light synthesizer.

The secondary modulated light 13 and tertiary modulated light 14 emitted from the tertiary polarized light beam splitter 10 enter a fourth multilayered phase differentiation filter 17 that rotates the plane of polarization of the secondary modulated light 13 90° and passes the secondary modulated light 13 and tertiary modulated light 14, injecting those lights into a fourth polarized light beam splitter 16. At this time the respective planes of polarization of the secondary modulated light 13 and the tertiary modulated light 14 are of the same direction.

In relation to a reflective surface 16a positioned in this polarized light beam splitter 16 at an inclination of 45° to the optical path of this incoming light this primary modulated light 8 is s-polarized light and the secondary modulated light 13 and tertiary modulated light 14 are p-polarized light. The primary modulated light 8 is reflected at the reflective surface 16a and emitted from the polarized light beam splitter 16. The secondary modulated light 13 and tertiary modulated light 14 pass the reflective surface 16a and are emitted from the polarized light beam splitter 16. The primary modulated light 8 as well as the secondary modulated light 13 and tertiary modulated light 14 are synthesized in this way.

The light emitted from this polarized light beam splitter 16 enters a ¼-wavelength plate (λ/4-plate) 18 providing a phase converter. This ¼-wavelength plate 18 circularly polarizes the primary modulated light 8, secondary modulated light 13 and tertiary modulated light 14 and injects those lights into an optical projection system 19. It is also suitable for the ¼-wavelength plate 18 to circularly polarize only the secondary modulated light 13 and the tertiary modulated light 14.

The optical projection system 19 projects this incoming light onto a screen not shown in the drawing, thereby displaying an image. This optical projection system 19 is formed of a plurality of lenses having an anti-reflection film formed thereon to improve the rate of light permeation.

In this image display apparatus, when reflection in the order of a few percent arises from this plurality of lenses providing the optical projection system 19 the light reflected (R', G', B') is light with a circular polarization of the opposite direction to light entering the optical projection system 19 and reenters the ¼-wavelength plate 18. The reflected light thus reentering this ¼-wavelength plate is converted from circularly polarized light to linearly polarized light. The direction of the plane of polarization at this time is a direction perpendicular to the direction of the plane of polarization of each of the modulated lights first entering this ¼-wavelength plate. Accordingly, reflected light entering the polarized light beam splitter 16 from the optical projection system 19 in this way does not return to the respective reflective spatial light modulators 7, 11 and 12. Thus, in this image display apparatus reflected light from the optical projection system 19 is not projected on screen superimposed over light coordinated to the original image information, enabling display of an image having high contrast and in which the ghosting phenomena does not occur.

In this image display apparatus, blue light reflected at the optical projection system 19 passes the polarized light beam splitter 16 and the tertiary polarized light beam splitter 10 and returns as far as the reflective spatial light modulators for green light 12 where there is the possibility that the blue light may be reflected and enter the optical projection system 19 again. Because the human eye has very low sensitivity to blue light however, in fact this causes no problem.

Further, in this image display apparatus, where primary color component light is red, secondary color component light is green and tertiary color component light is blue or secondary color component light is blue and tertiary color component light is green, because unnecessary reflection in the optical projection system 19 of green light to which the human eye has the greatest sensitivity is removed, a sufficient effect is achieved in relation to human vision.

Moreover, in this image display apparatus if emphasis is placed on red light and blue light in the elimination of unnecessary reflected light at the optical projection system 19, it is sufficient for primary color component light to be green, secondary color component light to be red and tertiary color component light to be blue or secondary color component light to be blue and tertiary color component light to be red.

FIG. 5 is a plan view of still another embodiment of an image display apparatus according to this invention.

This image display apparatus can be constructed as shown in FIG. 5. That is to say in this image display apparatus light beams emitted from a white light source white light source 1 are formed into parallel light beams by a concave reflector 2 before entering a polarized light selector 3.

This polarized light selector 3 forms a light beam emitted from the white light source 1 into linearly polarized light and passes this light. The red, green and blue light components of light beams emitted from the white light source 1 and passing the polarized light selector 3 each become linearly polarized light having a plane of polarization of the same direction.

A light beam emitted from the white light source 1 then enters a primary multilayered phase differentiation filter 4 that forms the primary wavelength selective polarized light converter. This multilayered phase differentiation filter 4 rotates the inclination of the plane of polarization of specific wavelength regions only 90°.

Red light, green light and blue light in a light beam passing this primary multilayered phase differentiation filter 4 are each linearly polarized and the plane of polarization of the primary color component light only is rotated 90°, while the plane of polarization of the primary color component light is perpendicular to the plane of polarization of the secondary color component light and tertiary color component light. In this embodiment, primary color component light is blue (B), secondary color component light is red (R) and tertiary color component light is green (G). That is to say, the plane of polarization of blue light is perpendicular in relation to the plane of polarization of red light and green light.

A light beam passing this primary multilayered phase differentiation filter 4 then enters a primary polarized light beam splitter 5 comprising the primary polarized light separator. In relation to a reflective surface 5a positioned in this primary polarized light beam splitter 5 at an inclination of 45° to the optical path of this incoming light, blue light becomes p-polarized light and red and green light become s-polarized light. Thus, in this primary polarized light beam splitter 5 blue light passes the reflective surface 5a while the reflective surface 5a reflects red and green light such that the optical path of the red light and green light diverges from the optical path of the blue light in response to the direction of the planes of polarization thereof.

Blue light emitted from the primary polarized light beam splitter 5 passes a multilayered phase differentiation filter for blue light 20 wherein the plane of polarization of this blue light is rotated 90° before entering a secondary polarized light beam splitter 6 comprising the secondary polarized light separator. In relation to a reflective surface 6a positioned at an inclination of 45° to the optical path of this incoming light this blue light is s-polarized light. This blue light is reflected at the reflective surface 6a and directed out from this secondary polarized light beam splitter 6 entering the reflective spatial light modulator for blue light 7, a liquid crystal display device, providing the primary reflective spatial light modulator wherein this light undergoes polarization-modulation coordinated to the blue light component of a displayed image and is reflected. The information for that displayed image is supplied from an external source.

The resulting primary modulated light 8 modulated and reflected by the reflective spatial light modulator for blue light 7 reenters the secondary polarized light beam splitter 6. As this primary modulated light 8 becomes p-polarized light in relation to the reflective surface 6a this light passes the reflective surface 6a and is emitted from the secondary polarized light beam splitter 6 in a direction different to the direction of returning to the primary polarized light beam splitter 5.

Red and green light emitted from the primary polarized light beam splitter 5 enters a secondary multilayered phase differentiation filter 9 providing the secondary wavelength selective polarized light converter. In this secondary multilayered phase differentiation filter 9 the plane of polarization of red light is made into a condition perpendicular to the plane of polarization of green light, and this red and green light pass the secondary multilayered phase differentiation filter 9.

Light beams passing this secondary multilayered phase differentiation filter 9 enter a tertiary polarized light beam splitter 10 providing the tertiary polarized light separator. In relation to a reflective surface 10a positioned at an inclination of 45° to the optical path of this incoming light this red light is p-polarized light and green light is s-polarized light.

Red light passes the reflective surface 10a and is emitted from the tertiary polarized light beam splitter 10 before entering the reflective spatial light modulator for red light 11 providing the secondary reflective spatial light modulator. Green light is reflected at the reflective surface 10a and directed out from this tertiary polarized light beam splitter 10 before entering the reflective spatial light modulator for green light 12 that is the tertiary reflective spatial light modulator.

The reflective spatial light modulators 11 and 12 are liquid crystal display devices; red light undergoing polarization-modulation coordinated to the red light component of a displayed image and being reflected in the reflective spatial light modulator for red light 11 and green light undergoing polarization-modulation coordinated to the green light component of a displayed image and being reflected in the reflective spatial light modulator for green light 12; the information for the respective displayed images therefor being supplied from an external source.

Secondary modulated light 13 modulated and reflected by the reflective spatial light modulator for red light 11, reenters the tertiary polarized light beam splitter 10. As this secondary modulated light 13 becomes s-polarized light in relation to the reflective surface 10a this light is reflected at the reflective surface 10a and is emitted from the tertiary polarized light beam splitter 10 in a direction different to the direction of returning to the primary polarized light beam splitter 5.

Tertiary modulated light 14 modulated and reflected by the reflective spatial light modulator for green light 12 reenters the tertiary polarized light beam splitter 10. As this tertiary modulated light 14 becomes p-polarized light in relation to the reflective surface 10a this light passes the reflective surface 10a and is emitted from the tertiary polarized light beam splitter 10 in a direction different to the direction of returning to the primary polarized light beam splitter 5.

Primary modulated light 8 emitted from the secondary polarized light beam splitter 6 enters a tertiary multilayered phase differentiation filter 15 that rotates the plane of polarization of this light 90° and passes this light, injecting this light into a fourth polarized light beam splitter 16 providing the polarized light synthesizer.

The secondary modulated light 13 and tertiary modulated light 14 emitted from the tertiary polarized light beam splitter 10 enter a fourth multilayered phase differentiation filter 17 that rotates the plane of polarization of the secondary modulated light 13 90° and passes the secondary modulated light 13 and tertiary modulated light 14 injecting those lights into a fourth polarized light beam splitter 16. At this time the respective planes of polarization of the secondary modulated light 13 and the tertiary modulated light 14 are of the same direction.

In relation to a reflective surface 16a positioned in this polarized light beam splitter 16 at an inclination of 45° to the optical path of this incoming light, this primary modulated light 8 is s-polarized light and the secondary modulated light 13 and tertiary modulated light 14 are p-polarized light. The primary modulated light 8 is reflected at the reflective surface 16a and emitted from the polarized light beam splitter 16. The secondary modulated light 13 and tertiary modulated light 14 pass the reflective surface 16a and are emitted from the polarized light beam splitter 16. The primary modulated light 8 as well as the secondary modulated light 13 and tertiary modulated light 14 are synthesized in this way.

The light emitted from this polarized light beam splitter 16 enters a ¼-wavelength plate (λ/4-plate) 18 providing the phase converter. This ¼-wavelength plate 18 circularly polarizes the primary modulated light 8, secondary modulated light 13 and tertiary modulated light 14 and injects those lights into an optical projection system 19. It is also suitable for the ¼-wavelength plate 18 to circularly polarize only the secondary modulated light 13 and the tertiary modulated light 14.

The optical projection system 19 projects this incoming light onto a screen not shown in the drawing, thereby displaying an image. This optical projection system 19 is formed of a plurality of lenses having an anti-reflection film formed thereon to improve the rate of light permeation.

In this image display apparatus, when reflection in the order of a few percent arises from this plurality of lenses providing the optical projection system 19, this light reflected (R', G', B') is light with a circular polarization of the opposite direction to light entering the optical projection system 19 and reenters the ¼-wavelength plate 18. The reflected light thus reentering this ¼-wavelength plate is converted from circularly polarized light to linearly polarized light. The direction of the plane of polarization at this time is a direction perpendicular to the direction of the plane of polarization of each of the modulated lights first entering this ¼-wavelength plate. Accordingly, reflected light entering the polarized light beam splitter 16 from the optical projection system 19 in this way does not return to the respective reflective spatial light modulators 7, 11 and 12. Thus, in this image display apparatus reflected light from the optical projection system 19 is not projected on screen superimposed over light coordinated to the original image information, enabling display of an image having high contrast and in which the ghosting phenomena does not occur.

In this image display apparatus, blue light reflected at the optical projection system 19 passes the polarized light beam splitter 16 and the tertiary polarized light beam splitter 10 and returns as far as the reflective spatial light modulator for green light 12 where there is the possibility that the blue light may be reflected and enter the optical projection system 19 again. Because the human eye has very low sensitivity to blue light however, in fact this causes no problem.

Further, in this image display apparatus, where primary color component light is red, secondary color component light is green and tertiary color component light is blue or secondary color component light is blue and tertiary color component light is green, because unnecessary reflection in the optical projection system 19 of green light to which the human eye has the greatest sensitivity is removed, a sufficient effect is achieved in relation to human vision.

Moreover, in this image display apparatus if emphasis is placed on red light and blue light in the elimination of unnecessary reflected light at the optical projection system 19, it is sufficient for primary color component light to be green, secondary color component light to be red and tertiary color component light to be blue or secondary color component light to be blue and tertiary color component light to be red.

FIG. 6 is a plan view of still another embodiment of an image display apparatus according to this invention.

This image display apparatus can be constructed as shown in FIG. 6. That is to say, in this image display apparatus light beams emitted from a white light source white light source 1 are formed into parallel light beams by a concave reflector 2 before entering a polarized light selector 3.

This polarized light selector 3 forms a light beam emitted from the white light source 1 into linearly polarized light and passes this light. The red, green and blue light components of light beams emitted from the white light source 1 and passing the polarized light selector 3 each become linearly polarized light having a plane of polarization of the same direction.

A light beam emitted from the white light source 1 enters a primary multilayered phase differentiation filter 4 that forms the primary wavelength selective polarized light converter. This multilayered phase differentiation filter 4 rotates the inclination of the plane of polarization of specific wavelength regions only 90°.

Red light, green light and blue light in a light beam passing this primary multilayered phase differentiation filter 4 are each linearly polarized and the plane of polarization of the primary color component light only is rotated 90°, while the plane of polarization of the primary color component light is perpendicular to the plane of polarization of the secondary color component light and tertiary color component light. In this embodiment, primary color component light is green (G), secondary color component light is red (R) and tertiary color component light is blue (B). That is to say, the plane of polarization of green light is perpendicular in relation to the plane of polarization of red light and blue light.

A light beam passing this primary multilayered phase differentiation filter 4 then enters a primary polarized light beam splitter 5 comprising the primary polarized light separator. In relation to a reflective surface 5a positioned in this primary polarized light beam splitter 5 at an inclination of 45° to the optical path of this incoming light, green light becomes p-polarized light and red and blue light become s-polarized light. Thus, in this primary polarized light beam splitter 5 green light passes the reflective surface 5a while the reflective surface 5a reflects red and blue light such that the optical path of the red light and blue light diverges from the optical path of the green light in response to the direction of the planes of polarization thereof.

Green light emitted from the primary polarized light beam splitter 5 enters a secondary polarized light beam splitter 6 providing the secondary polarized light separator. In relation to a reflective surface 6a positioned in this secondary polarized light beam splitter 6 at an inclination of 45° to the optical path of this incoming light, this green light is p-polarized light. This green light passes the reflective surface 6a and is directed out from this secondary polarized light beam splitter 6 entering the reflective spatial light modulator for green light 12, a liquid crystal display device providing the primary reflective spatial light modulator, wherein this light undergoes polarization-modulation coordinated to the green light component of a displayed image and is reflected. The information for that displayed image is supplied from an external source.

The resulting primary modulated light 8 modulated and reflected by the reflective spatial light modulator for green light 12 reenters the secondary polarized light beam splitter 6. As this primary modulated light 8 becomes s-polarized light in relation to the reflective surface 6a this light is reflected at the reflective surface 6a and is emitted from the secondary polarized light beam splitter 6 in a direction different to the direction of returning to the primary polarized light beam splitter 5.

Red and blue light emitted from the primary polarized light beam splitter 5 enters a secondary multilayered phase differentiation filter 9 providing the secondary wavelength selective polarized light converter wherein the plane of polarization of red light is made into a condition perpendicular to the plane of polarization of blue light, and this red and blue light pass the secondary multilayered phase differentiation filter 9.

Light beams passing this secondary multilayered phase differentiation filter 9 enter a tertiary polarized light beam splitter 10 providing the tertiary polarized light separator. In relation to a reflective surface 10a positioned at an inclination of 45° to the optical path of this incoming light this red light is p-polarized light and blue light is s-polarized light.

Red light passes the reflective surface 10a and is emitted from the tertiary polarized light beam splitter 10 before entering the reflective spatial light modulator for red light 11 providing the secondary reflective spatial light modulator. Blue light is reflected at the reflective surface 10a and directed out from this tertiary polarized light beam splitter 10 before entering the reflective spatial light modulator for blue light 7 that is the tertiary reflective spatial light modulator.

The reflective spatial light modulators 11 and 7 are liquid crystal display devices; red light undergoing polarization-modulation coordinated to the red light component of a displayed image and being reflected in the reflective spatial light modulator for red light 11 and blue light undergoing polarization-modulation coordinated to the blue light component of a displayed image and being reflected in the reflective spatial light modulator for blue light 7; the information for the respective displayed images therefor being supplied from an external source.

Secondary modulated light 13 modulated and reflected by the reflective spatial light modulator for red light 11 reenters the tertiary polarized light beam splitter 10. As this secondary modulated light 13 becomes s-polarized light in relation to the reflective surface 10a the secondary modulated light 13 is reflected at the reflective surface 10a and is emitted from the tertiary polarized light beam splitter 10 in a direction different to the direction of returning to the primary polarized light beam splitter 5.

Tertiary modulated light 14 modulated and reflected by the reflective spatial light modulator for blue light 7 reenters the tertiary polarized light beam splitter 10. As this tertiary modulated light 14 becomes p-polarized light in relation to the reflective surface 10a the tertiary modulated light 14 passes the reflective surface 10a and is emitted from the tertiary polarized light beam splitter 10 in a direction different to the direction of returning to the primary polarized light beam splitter 5.

Primary modulated light 8 emitted from the secondary polarized light beam splitter 6 enters a fourth polarized light beam splitter 16 providing the polarized light synthesizer. Further, secondary modulated light 13 and tertiary modulated light 14 emitted from the tertiary polarized light beam splitter 10 enter a tertiary multilayered phase differentiation filter 17 that rotates the plane of polarization of the secondary modulated light 13 90° and passes the secondary modulated light 13 and the tertiary modulated light 14, injecting those lights into a fourth polarized light beam splitter 16 providing the polarized light synthesizer. At this time, the secondary modulated light 13 and tertiary modulated light 14 have a plane of polarization of the same direction.

In relation to a reflective surface 16a positioned in this polarized light beam splitter 16 at an inclination of 45° to the optical path of this incoming light this primary modulated light 8 is s-polarized light and the secondary modulated light 13 and tertiary modulated light 14 are p-polarized light. The primary modulated light 8 is reflected at the reflective surface 16a and emitted from the polarized light beam splitter 16. The secondary modulated light 13 and tertiary modulated light 14 pass the reflective surface 16a and are emitted from the polarized light beam splitter 16. The primary modulated light 8 as well as the secondary modulated light 13 and tertiary modulated light 14 are synthesized in this way.

The light emitted from this polarized light beam splitter 16 enters a fourth multilayered phase differentiation filter 21 that rotates the plane of polarization of the primary modulated light 8 only, 90° and passes the primary modulated light 8, secondary modulated light 13 and tertiary modulated light 14. At this time the respective planes of polarization of the primary, secondary and tertiary modulated lights 8, 13 and 14 are of the same direction.

The modulated lights 8, 13 and 14 emitted from this polarized light beam splitter 16 enter a ¼-wavelength plate (λ/4-plate) 18 providing the phase converter. This ¼-wavelength plate 18 polarizes the respective planes of polarization of these modulated lights to the same direction and injects those modulated lights into an optical projection system 19.

The optical projection system 19 projects this incoming light onto a screen not shown in the drawing, thereby displaying an image. This optical projection system 19 is formed of a plurality of lenses having an anti-reflection film formed thereon to improve the rate of light permeation In this image display apparatus, when reflection in the order of a few percent arises from this plurality of lenses providing the optical projection system 19 this light reflected (R', G', B') is light with a circular polarization of the opposite direction to light entering the optical projection system 19 and reenters the ¼-wavelength plate 18. The reflected light thus reentering this ¼-wavelength plate 18 is converted from circularly polarized light to linearly polarized light. The direction of the plane of polarization at this time is a direction perpendicular to the direction of the plane of polarization of each of the modulated lights first entering this ¼-wavelength plate. Accordingly, reflected light entering the polarized light beam splitter 16 from the optical projection system 19 in this way does not return to the respective reflective spatial light modulators 7, 11 and 12. Thus, in this image display apparatus, reflected light from the optical projection system 19 is not projected on screen superimposed over light coordinated to the original image information, enabling display of an image having high contrast and in which the ghosting phenomena does not occur.

Further, in this image display apparatus primary color component light can be red or blue and the secondary and tertiary color component lights can be green and blue or red and green. In either such configuration unnecessary reflection in the optical projection system 19 is removed and a sufficient effect is achieved in relation to human vision.

FIG. 7 is a plan view of still another embodiment of an image display apparatus according to this invention.

This image display apparatus can be constructed as shown in FIG. 7. That is to say in this image display apparatus light beams emitted from a white light source white light source 1 are formed into parallel light beams by a concave reflector 2 before entering a polarized light selector 3.

This polarized light selector 3 forms a light beam emitted from the white light source 1 into linearly polarized light and passes this light. The red, green and blue light components of light beams emitted from the white light source 1 and passing the polarized light selector 3 each become linearly polarized light having a plane of polarization of the same direction.

A light beam emitted from the white light source 1 then enters a primary multilayered phase differentiation filter 4 that forms the primary wavelength selective polarized light converter. This multilayered phase differentiation filter 4 rotates the inclination of the plane of polarization of specific wavelength regions only 90°.

Red light, green light and blue light in a light beam passing this primary multilayered phase differentiation filter 4 are each linearly polarized and the plane of polarization of the primary color component light only is rotated 90°, while the plane of polarization of the primary color component light is perpendicular to the plane of polarization of the secondary color component light and tertiary color component light. In this embodiment, primary color component light is green (G), secondary color component light is red (R) and tertiary color component light is blue (B). That is to say, the plane of polarization of green light is perpendicular in relation to the plane of polarization of red light and blue light.

A light beam passing this primary multilayered phase differentiation filter 4 then enters a primary polarized light beam splitter 5 comprising the primary polarized light separator. In relation to a reflective surface 5a that is positioned in this primary polarized light beam splitter 5 at an inclination of 45° to the optical path of this incoming light, green light becomes p-polarized light and red and blue light become s-polarized light. Thus, in this primary polarized light beam splitter 5 green light passes the reflective surface 5a while the reflective surface 5a reflects red and blue light such that the optical path of the red light and blue light diverges from the optical path of the green light in response to the direction of the planes of polarization thereof.

Green light emitted from the primary polarized light beam splitter 5 enters a secondary polarized light beam splitter 6 providing the secondary polarized light separator. In relation to a reflective surface 6a positioned in this secondary polarized light beam splitter 6 at an inclination of 45° to the optical path of this incoming light, this green light is p-polarized light. This green light passes the reflective surface 6a and is directed out from this secondary polarized light beam splitter 6 entering the reflective spatial light modulator for green light 12, a liquid crystal display device providing the primary reflective spatial light modulator wherein this light undergoes polarization-modulation coordinated to the green light component of a displayed image and is reflected. The information for that displayed image is supplied from an external source.

The resulting primary modulated light 8 modulated and reflected by the reflective spatial light modulator for green light 12 reenters the secondary polarized light beam splitter 6. As this primary modulated light 8 becomes s-polarized light in relation to the reflective surface 6a this light is reflected at the reflective surface 6a and emitted from the secondary polarized light beam splitter 6 in a direction different to the direction of returning to the primary polarized light beam splitter 5.

Red and blue light emitted from the primary polarized light beam splitter 5 enters a secondary multilayered phase differentiation filter 9 providing a secondary wavelength selective polarized light converter. In this secondary multilayered phase differentiation filter 9 the plane of polarization of red light is made into a condition perpendicular to the plane of polarization of blue light, and this red and blue light pass the secondary multilayered phase differentiation filter 9.

Light beams passing this secondary multilayered phase differentiation filter 9 enter a tertiary polarized light beam splitter 10 providing the tertiary polarized light separator. In relation to a reflective surface 10a positioned at an inclination of 45° to the optical path of this incoming light red light is p-polarized light and blue light is s-polarized light.

Red light passes the reflective surface 10a and is emitted from the tertiary polarized light beam splitter 10 before entering the reflective spatial light modulator for red light 11 providing the secondary reflective spatial light modulator. Blue light is reflected at the reflective surface 10a and directed out from this tertiary polarized light beam splitter 10 before entering the reflective spatial light modulator for blue light 7 that is the tertiary reflective spatial light modulator.

The reflective spatial light modulators 11 and 7 are liquid crystal display devices; red light undergoing polarization-modulation coordinated to the red light component of a displayed image and being reflected in the reflective spatial light modulator for red light 11 and blue light undergoing polarization-modulation coordinated to the blue light component of a displayed image and being reflected in the reflective spatial light modulator for blue light 7; the information for the respective displayed images therefor being supplied from an external source.

Secondary modulated light 13 modulated and reflected by the reflective spatial light modulator for red light 11 reenters the tertiary polarized light beam splitter 10. As this secondary modulated light 13 becomes s-polarized light in relation to the reflective surface 10a the secondary modulated light 13 is reflected at the reflective surface 10a and is emitted from the tertiary polarized light beam splitter 10 in a direction different to the direction of returning to the primary polarized light beam splitter 5.

Tertiary modulated light 14 modulated and reflected by the reflective spatial light modulator for blue light 7 reenters the tertiary polarized light beam splitter 10. As this tertiary modulated light 14 becomes p-polarized light in relation to the reflective surface 10a the tertiary modulated light 14 passes the reflective surface 10a and is emitted from the tertiary polarized light beam splitter 10 in a direction different to the direction of returning to the primary polarized light beam splitter 5.

Primary modulated light 8 emitted from the secondary polarized light beam splitter 6 enters a fourth polarized light beam splitter 16 providing the polarized light synthesizer. Further, the secondary modulated light 13 and tertiary modulated light 14 emitted from the tertiary polarized light beam splitter 10 enter a tertiary multilayered phase differentiation filter 17 that rotates the plane of polarization of the secondary modulated light 13 90° and passes the secondary modulated light 13 and the tertiary modulated light 14, injecting those lights into a fourth polarized light beam splitter 16. At this time, the secondary modulated light 13 and tertiary modulated light 14 have a plane of polarization of the same direction.

In relation to a reflective surface 16a positioned in this polarized light beam splitter 16 at an inclination of 45° to the optical path of this incoming light this primary modulated light 8 is s-polarized light and the secondary modulated light 13 and tertiary modulated light 14 are p-polarized light. The primary modulated light 8 is reflected at the reflective surface 16a and emitted from the polarized light beam splitter 16. The secondary modulated light 13 and tertiary modulated light 14 pass the reflective surface 16a and are emitted from the polarized light beam splitter 16. The primary modulated light 8 as well as the secondary modulated light 13 and tertiary modulated light 14 are synthesized in this way.

The light emitted from this polarized light beam splitter 16 enters a fourth multilayered phase differentiation filter 21 that rotates the plane of polarization of only the primary modulated light 8 90° and passes the primary modulated light 8, secondary modulated light 13 and tertiary modulated light 14. At this time the respective planes of polarization of these modulated lights are of the same direction.

The modulated lights 8, 13 and 14 emitted from this polarized light beam splitter 16 enter a polarized light selector 22 such as a polarized light filter or the like before entering a ¼-wavelength plate (λ/4-plate) 18 providing a phase converter. This ¼-wavelength plate 18 polarizes the respective planes of polarization of these modulated lights to the same direction and injects those modulated lights into an optical projection system 19.

The optical projection system 19 projects this incoming light onto a screen not shown in the drawing, thereby displaying an image. This optical projection system 19 is formed of a plurality of lenses having an anti-reflection film formed thereon to improve the rate of light permeation.

In this image display apparatus, when reflection in the order of a few percent arises from this plurality of lenses providing the optical projection system 19 this light reflected (R', G', B') is light with a circular polarization of the opposite direction to light entering the optical projection system 19 and reenters the ¼-wavelength plate 18. The reflected light thus reentering this ¼-wavelength plate 18 is converted from circularly polarized light to linearly polarized light. The direction of the plane of polarization at this time is a direction perpendicular to the direction of the plane of polarization of each of the modulated lights first entering this ¼-wavelength plate. Accordingly, reflected light reflected at the optical projection system 19 in this way is interrupted at the polarized light selector 22 and does not reenter the polarized light beam splitter 16. Thus, in this image display apparatus reflected light from the optical projection system 19 is not projected on screen superimposed over light coordinated to the original image information, enabling display of an image having high contrast and in which the ghosting phenomena does not occur.

In this image display apparatus primary color component light can be red or blue and the secondary and tertiary color component lights can be green and blue or red and green. In either such configuration unnecessary reflection in the optical projection system 19 is removed and a sufficient effect is achieved in relation to human vision.

In this image display apparatus, as at least secondary modulated light and tertiary modulated light of the primary, secondary and tertiary modulated lights synthesized by the polarized light synthesizer are converted into circularly polarized light and also emitted to an optical projection system by the phase converter, light reflected at the optical projection system reenters the phase converter and is thus in a condition in which the plane of polarization thereof is perpendicular in relation to the light that originally entered the phase converter.

Accordingly reflected light from the optical projection system that reenters the polarized light synthesizer does not return to the reflective spatial light modulators for the respective colors. Thus, in this image display apparatus reflected light from the optical projection system is not projected on screen superimposed over light coordinated to the original image information, enabling display of an image having high contrast and in which the ghosting phenomena does not occur.

When the primary color component light in this image display apparatus is blue, the secondary color component light is red and the tertiary color component light is green, blue light reflected at the optical projection system may return as far as the reflective spatial light modulators and again enter the optical projection system, however no problem arises in reality because the human eye has very low sensitivity to blue light.

Again, a tertiary wavelength selective polarized light converter is disposed between the polarized light synthesizer and phase converter of this image display apparatus, which tertiary wavelength selective polarized light converter makes the respective planes of polarization of the primary, secondary and tertiary modulated lights emitted from the polarized light synthesizer of the same direction and injects those lights into the phase converter such that reflected light reflected at the optical projection system and reentering the polarized light synthesizer can be definitively prevented from returning to the reflective spatial light modulators for the respective colors, red, green and blue.

Moreover, a polarized light selector that selects and allows to pass only light having a plane of polarization of a prescribed direction is disposed between the tertiary wavelength selective polarized light converter and phase converter of this image display apparatus, enabling reflected light reflected at the optical projection system to be blocked from reentering the polarized light synthesizer.

That is to say, the present invention provides an image display apparatus employing reflective spatial light modulators that displays a high-quality image, having unnecessary image elements removed and having good contrast and no occurrence of the ghosting phenomena.

That which is claimed:

1. An image display apparatus comprising:

a white light emitting source;

a primary wavelength selective polarized light converter for converting light emitted from said light emitting source to a condition such that the red light, green light and blue light components thereof are each linearly polarized, the plane of polarization of a primary color component light being perpendicular in relation to the plane of polarization of a secondary color component light and a tertiary color component light;

a primary polarized light separator into which light passing through said primary wavelength selective polarized light converter enters, that separates the optical path of said primary color component light and the optical path of said secondary color component light and said tertiary color component light in coordination to the respective directions of the planes of polarization thereof;

a secondary polarized light separator into which said primary color component light enters from said primary polarized light separator, that injects said primary color component light into a primary reflective spatial light modulator and into which primary modulated light, polarization-modulated in coordination to a primary color component of a displayed image as well as reflected by, said primary reflective spatial light modulator reenters and that emits said primary modulated light in a direction different to the direction of returning to said primary polarized light separator;

a secondary wavelength selective polarized light converter into which said secondary color component light and said tertiary color component light enter from said first polarized light separator and wherein the plane of polarization of said tertiary color component light is made into a condition perpendicular to the plane of polarization of said secondary color component light;

a tertiary polarized light separator into which said secondary color component light and said tertiary color component light enter from said secondary wavelength selective polarized light converter, that injects said secondary color component light into a secondary reflective spatial light modulator and injects said tertiary color component light into a tertiary reflective spatial light modulator, into which secondary modulated light, polarization-modulated in coordination to a secondary color component of a displayed image as well as reflected by, said secondary reflective spatial light modulator reenters and into which tertiary modulated light, polarization-modulated in coordination to a tertiary color component of a displayed image as well as reflected by, said tertiary reflective spatial light modulator reenters and that emits said secondary modulated light and said tertiary modulated light in a direction different to the direction of returning to said secondary wavelength selective polarized light converter;

a polarized light synthesizer into which enters said primary modulated light emitted from said secondary polarized light separator and said secondary modulated light and tertiary modulated light emitted from said tertiary polarized light separator, and that synthesizes and then emits said primary, secondary and tertiary modulated lights; and a phase converter into which enters light emitted from said polarized light synthesizer, that makes at least said second modulated light and said third modulated light into circularly polarized light and emits these circularly polarized lights to an optical projection system.

2. An image display apparatus according to claim 1 further comprising a tertiary wavelength selective polarized light converter disposed between said polarized light synthesizer and said phase converter, that makes the planes of polarization of said primary, secondary and tertiary modulated lights emitted from said polarized light synthesizer of the same direction.

3. An image display apparatus according to claim 2 further comprising a polarized light selector disposed between said tertiary wavelength selective polarized light converter and said phase converter that selects and allows to pass only light having a plane of polarization of a prescribed direction.

* * * * *